United States Patent [19]

Subramanian et al.

[11] 4,272,493

[45] Jun. 9, 1981

[54] PELLETIZING SULFATION OF ANODE SLIMES

[75] Inventors: Kohur N. Subramanian, East Hanover, N.J.; Rotrou A. Hall, Mississauga; Gerald V. Glaum, Oakville, both of Canada

[73] Assignee: The International Nickel Co., Inc., New York, N.Y.

[21] Appl. No.: 146,231

[22] Filed: May 5, 1980

[30] Foreign Application Priority Data

Jun. 14, 1979 [CA] Canada .................................... 329748

[51] Int. Cl.³ .......................... C01G 3/10; C01B 19/02
[52] U.S. Cl. ........................................ 423/41; 423/45; 423/508; 423/510; 75/3; 75/99; 75/115
[58] Field of Search ................. 75/99, 115, 3; 423/41, 423/45, 508, 510

[56] References Cited

U.S. PATENT DOCUMENTS

| 1,741,544 | 12/1929 | Slagle | 75/3 |
| 2,039,256 | 4/1936 | Martin | 75/99 |
| 2,322,348 | 6/1943 | Clark | 423/509 |
| 4,002,469 | 1/1977 | Oliver | 75/115 |

FOREIGN PATENT DOCUMENTS

1263315 . 3/1968 Fed. Rep. of Germany .............. 75/99

OTHER PUBLICATIONS

Cooper, W. (Ed.) *Tellurium*, Van Nostrand Reinhold Co. NY (1971) pp. 20-29.
Zingaro, R. et al. (Ed.) *Selenium*, Van Nostrand Reinhold Co. NY (1974) pp. 38-52.
Schloen et al. "Treatment of Electrolytic Copper Refinery Slimes" *Journal of Metals*, May, 1950, Trans. AIME, vol. 188 pp. 764-777.

*Primary Examiner*—Brian E. Hearn
*Attorney, Agent, or Firm*—Raymond J. Kenny; Ewan C. MacQueen

[57] ABSTRACT

Anode slimes from an electrorefining operation are fed, together with sulfuric acid, into a heated pelletizer wherein a sulfation reaction occurs, simultaneously with pellet formation, to solubilize copper, nickel and tellurium contained in the slimes.

5 Claims, 2 Drawing Figures

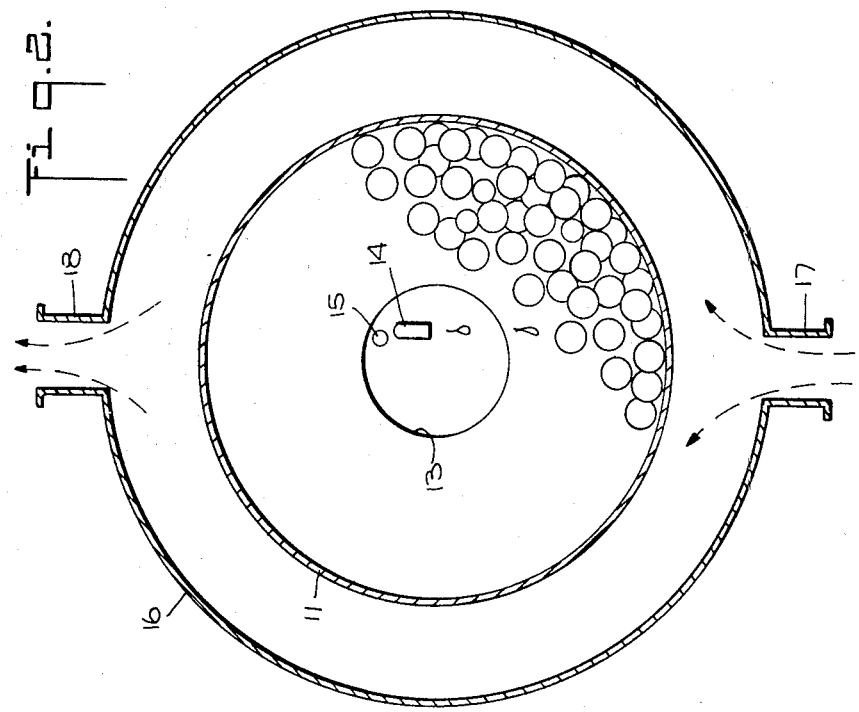
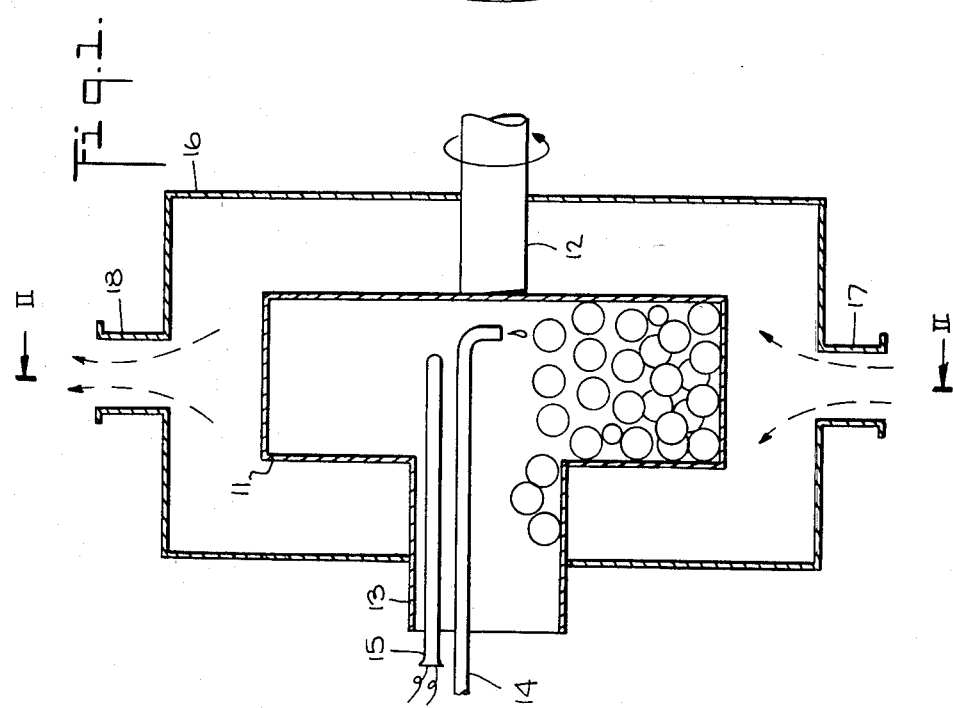

PELLETIZING SULFATION OF ANODE SLIMES

FIELD OF THE INVENTION

The present invention relates to the solubilization of copper, nickel and tellurium present in anode slimes obtained from an electrorefining operation by treating the slimes with sulfuric acid to sulfate the metals to be solubilized.

BACKGROUND OF THE INVENTION

Anode slimes obtained from the tanks of a copper electrorefinery are processed to recover various metal values contained therein. In particular the anode slimes contain varying amounts of selenium and in fact such slimes constitute the largest source of that element. In addition to selenium, however, the slimes also contain copper and tellurium, and depending on the particular copper electrorefinery and the source ore involved they may also contain nickel, silver, gold, lead, antimony, bismuth, arsenic and iron.

Processes aimed at recovering selenium from anode slimes most commonly involve, as a first step, treating the slimes with sulfuric acid to convert such metals as copper, nickel and iron to soluble sulfates. The sulfation process which is usually carried out at elevated temperatures solubilizes most of the tellurium present while leaving most of the selenium in an oxidic form so that a roasting operation following the sulfation yields selenium dioxide vapor. Apart from environmental problems associated with the vaporization step, such a sulfation which may be carried out in kettles heated to about 330° C. to yield a paste which is pan-roasted at about 400° C. is limited to implementation as a batch operation.

An alternative procedure aimed at avoiding the vaporization of selenium dioxide is described in a paper entitled: "Treatment of Anode Slimes at the INCO Copper Refinery" presented by R. K. Monohan and F. Loewen to the CIM Annual Conference 1972, Halifax, Nova Scotia. The procedure described comprises reacting the slimes with a sufficiently large amount of sulfuric acid to retain fluidity in a continuously stirred tank maintained at 215° C. This results in solubilization of the copper and nickel without vaporization of selenium and the process is amenable to a continuous mode of operation. An inherent difficulty is presented by the need to use a large excess of acid to maintain the fluidity of the charge in the tank. A typical amount of acid needed would be about 400% of the weight of the moist slimes, which is equivalent to about 500% of the weight of slime solids. The operating costs of the process are therefore adversely affected by the cost of the acid needed as well as the subsequent acid-bleeding operation which has to be undertaken if the solution is to be recycled to the copper refinery.

OBJECT OF THE INVENTION

The present invention is aimed at providing a process whereby acid attack of anode slimes can take place efficiently in comparatively simple apparatus to convert copper, nickel and tellurium in the slimes to water-soluble compounds while avoiding excessive consumption of sulfuric acid.

SUMMARY OF THE INVENTION

According to the invention, a process is provided for treating anode slimes which contain copper, selenium and tellurium with sulfuric acid to recover water-soluble compounds of copper and tellurium in solid form, wherein the improvement comprises introducing the slimes and concentrated sulfuric acid in an amount of between about 120 and 150% by weight of the slime solids into a heated pelletizing apparatus, maintaining the slimes at a temperature between 180° and 240° C. while forming pellets thereof, and withdrawing formed pellets at such a rate as to provide a residence time of between 0.5 and 5 hours for the slimes in the pelletizing apparatus, whereby reaction between the sulfuric acid and slimes to solubilize at least part of the copper and tellurium present takes place simultaneously with formation of the pellets.

We have found that when the slimes are subjected to hot pelletization, the sulfation of at least part of the copper and tellurium, which occurs during the pelletization operation, results in the formation of strong dry pellets which are conveniently handled within, and readily withdrawn from, the pelletizer. To ensure the attainment of such a desirable result, it is essential to control the temperature during pelletization to within the range 180° to 240° C. Too low a pelletization temperature would result in little or no sulfation occurring simultaneously with pellet formation, any pellets so produced would be weak and mushy in view of their high acid content. At the other extreme, too high a pelletizing temperature would bring about an unacceptably high amount of acid evaporation, and heavy fuming is wasteful as well as being environmentally objectionable. For these reasons, it is preferred that the pelletization be carried out at 190° to 210° C., e.g., 200° C.

As stated above, the slimes will generally contain various ingredients other than the copper, selenium and tellurium. The behavior of such other ingredients does not appear to differ from their behavior in prior art sulfation processes where the relative amount of sulfuric acid is much greater. Thus any nickel, arsenic and iron in the slimes will be sulfated, at least partially, and rendered water-soluble. Any silver or gold in the slimes will not be sulfated and will remain water-insoluble with the selenium as will lead despite its sulfation.

The novel process of the invention is commercially attractive for several reasons. Firstly, it provides a convenient way of carrying out the sulfation in a continuous manner and yet in relatively simple apparatus. Secondly, the product obtained is easily handled and susceptible to a continuous water leaching operation with a relatively short retention needed for dissolution.

The heat needed to maintain the pelletizer charge at the desired temperature is provided to a large extent by the exothermic heat of the sulfation reaction. The supplemental heat needed for temperature control can be supplied in any convenient manner, for example, by blowing hot air around the pelletizer. The blowing of hot air directly onto the pellets in the pelletizing chamber is undesirable if excessive sulfuric acid losses by vaporization are to be avoided. The invention is not restricted to the use of any particular design of pelletizer and, in fact, it can be practiced with any disc-pelletizer or drum-pelletizer of known design providing the pelletizer is equipped with means for heating and maintaining its charge within the desired temperature range. Preferably the apparatus should also be equipped with means for coping with the fumes given off during the hot pelletization.

The slimes and the appropriate amount of sulfuric acid may be fed individually into the pelletizer and mixed therein, for example, by arranging for the acid to be sprayed onto the solids within the pelletizer. We have found it more convenient, however, to pre-mix the solids with the acid at ambient temperature and continuously feed the resulting slurry into the pelletizer.

The precise relative proportions of solids and acids have to be chosen in accordance with the composition of the solids in question. In general, if the amount of sulfuric acid is less than 120% of the weight of the solids, an unacceptably low extraction of the sulfatable metals is obtained. On the other hand, the amount of sulfuric acid must not exceed about 150% of the weight of the solids if conveniently handled pellets are to be produced. Excessive amounts of acid lead to formation of soft mushy pellets. Moreover, the pellets formed under such high acid conditions contain substantial amounts of free acid and cause severe corrosion of apparatus used for their subsequent treatment.

The extent to which solubilization occurs within the pelletizer will depend on both the temperature and duration of the pelletizing operation. While it is possible to aim for a substantially complete solubilization, i.e., of those slime constituents which can be solubilized by sulfation, to take place within the pelletizer, we have found it unnecessary to resort to the long retention times, and hence large pelletizer vessels, that would be necessitated thereby. We have found that providing sulfation occurs to a sufficient extent within the pelletizer to ensure dry, manageable pellets of adequate strength, additional sulfation can be made to take place outside the pelletizer in a simple heat treatment furnace. Such a heat treatment, which we refer to herein as a curing operation, merely involves maintaining the pellets withdrawn from the pelletizer at a temperature of 180° to 240° C., i.e., a similar temperature to that at which the pellets were formed. Since the vessel used for curing need not be subjected to mechanical movement to impart any vibratory or tumbling motion to the pellets, the curing vessel is more economical to operate than the pelletizer. Energy required by the curing vessel is minimized by the feeding of hot pellets directly from the pelletizer, as well as by the exothermic heat released as sulfation proceeds. Accordingly, it is preferred to employ the minimum pelletizing residence time consistent with adequate pellet dryness and strength, e.g., 0.5 to 1 hour, and thereafter heat treat the pellets in a curing vessel for a period of at least 0.5 hour and as long as 4 hours or longer to complete the tellurium solubilization.

The slimes which are to be treated by the process of the invention must be of reasonably fine particle size, e.g., of the order of −20 Mesh (Tyler Screen Size). Where the raw slimes are of such fineness grinding will not be required. though it may be preferred to grind the feed so that at least 90% of the solids are finer than 200 Mesh (Tyler Screen Size). Such a solids feed can be formed into pellets of the order of 0.1 to 2.0 cm diameter. Depending on the amount of pellet fracture that occurs during pelletization, it might be necessary to crush some of the pellets and return them to the pelletizer to act as seed.

A slime treatment incorporating the process of the invention might therefore consist of the following steps:
(i) slimes from a copper electrorefinery are separated from the electrolyte by filtration;
(ii) the slimes are slurried with the appropriate amount of concentrated sulfuric acid;
(iii) the slurry is fed to a hot pelletizer wherein part of the sulfation takes place;
(iv) the pellets are transferred to a curing vessel where sulfation proceeds to completion;
(v) the cured pellets are leached with warm water to provide a liquor containing most of any nickel, copper and tellurium present in the slimes;
(vi) the liquor is separated from the leach residue which will contain most of any selenium, silver and precious metals present in the slimes;
(vii) the liquor is treated with copper powder to cement tellurium and any selenium contained therein;
(viii) the cemented selenium and tellurium is filtered and the liquor recycled to the copper electrorefinery.

The invention will now specifically be described with reference to the accompanying drawings.

BRIEF DESCRIPTION OF THE DRAWINGS

FIG. 1 of the accompanying drawings illustrates a cross section of apparatus which can be used for carrying out hot pelletization in accordance with the invention; and FIG. 2 is an orthogonal cross-sectional view through the line II—II of FIG. 1.

DETAILED DESCRIPTION OF THE EMBODIMENT

The drawings illustrate the design of a pelletizing drum used to carry out the tests hereinafter described. The drum 11 was a 15 cm diameter, 5 cm long cylinder rigidly mounted on a rotatable drive shaft 12 connected to a drive motor (not illustrated). The drum was provided with a flanged 5 cm port 13 at the center of the planar face remote from the drive shaft. A feed pipe 14 entered the drum through the port 13 and was positioned so as to deliver slurry at a point close to the center of the drum 11. A thermocouple 15 was fitted through the port 13 to sense the temperature within the drum. The port 13 also provided a means of egress for the pellets from the drum. Surrounding the drum was a stationary housing 16 equipped with an inlet aperture and an outlet aperture 17 and 18 respectively. In operation hot air from an electric heating fan (not illustrated) was blown into the aperture 17 and withdrawn from the aperture 18 to provide the flow pattern indicated by the broken arrows in the space between the rotating drum 11 and the stationary housing 16.

A series of tests were conducted in the above-described apparatus on a batch of anode slimes which had the following analysis, in percent by weight:
Copper: 15.4
Nickel: 11.2
Tellurium: 2.1
Selenium: 12.8
Silver: 12.7
Sulfur: 3.9
Water: 19

The slimes were slurried with various amounts of sulfuric acid and the slurry was fed in a continuous manner into the pelletizer. Pelletizing temperatures of 210° to 240° C. were used for the tests, and residence times used ranged from 2.5 to 5 hours. In some cases the pellets were cured for 2 hours at 200° C. after their removal from the pelletizer, the curing being carried out in a stationary vessel under nitrogen atmosphere.

After the pelletizing and, where appropriate, curing of the pellets, water leaching was carried out by contacting the pellets with an equal weight of water at 80° C. for two hours. The residue after water leaching was analyzed for copper, nickel, selenium and tellurium. The results obtained are shown in the table below.

| | PELLETIZING CONDITIONS | | | | RESIDUE OF WATER LEACH | | | | | EXTRACTIONS ACHIEVED (%) | | | |
|---|---|---|---|---|---|---|---|---|---|---|---|---|---|
| Test | $H_2SO_4$ amount (% by weight of solids) | Temp. (°C.) | Residence (hours) | Curing Time (hours) | Weight (% of feed solids) | Analysis (% by weight) | | | | Cu | Ni | Te | Se |
| | | | | | | Cu | Ni | Te | Se | | | | |
| 1 | 123 | 210 | 3 | 0 | 39.5 | 0.8 | 5.6 | 0.6 | 35 | 98 | 80 | 88 | 11 |
| 2 | 123 | 210 | 3 | 2 | 38.3 | 0.7 | 4.4 | 0.7 | 37 | 98 | 85 | 87 | 11 |
| 3 | 136 | 215 | 4 | 0 | 38.3 | 0.6 | 3.9 | 0.8 | 37 | 99 | 89 | 88 | 12 |
| 4 | 136 | 215 | 4 | 2 | 37.0 | 0.6 | 2.6 | 0.8 | 38 | 99 | 93 | 88 | 12 |
| 5 | 148 | 215 | 5 | 2 | 37.0 | 0.6 | 1.6 | 0.6 | 38 | 99 | 96 | 90 | 12 |
| 6 | 136 | 240 | 2.5 | 0 | 39.5 | 0.7 | 4.5 | 0.6 | 36 | 99 | 87 | 91 | 11 |
| 7 | 136 | 240 | 2.5 | 2 | 39.5 | 0.7 | 3.0 | 0.7 | 33 | 99 | 92 | 89 | 14 |

By way of comparison, a sulfation was carried out without pelletization by slurrying a further sample of the same slimes filter cake used in tests 1 through 7 with an amount of acid corresponding to about 500% of the weight of slime solids. This slurry was heated at 210° C. for two hours. The resulting product was water leached with twice its volume of water at 80° C. for two hours. A residue was obtained which weighed 32.1% of the weight of feed solids and analyzed, in percent by weight:

Copper: 0.5
Nickel: 0.9
Tellurium: 0.5
Selenium: 33

This corresponds to extractions of:

Copper: 99%
Nickel: 98%
Tellurium: 93%
Selenium: 32%

A comparison of this result with those of tests 1 through 7 shows that the process of the invention enables comparably good extractions to be achieved with four times less acid than was used in the slurry sulfation test. Indeed in all of the tests according to the invention the separation of selenium from tellurium was markedly better than that obtained in the comparative experiment. Very little of the silver present in the feed was extracted in any of the tests carried out. Measurement of selenium vaporization during the sulfation showed that 0.22% of the selenium in the feed was vaporized in the comparative test, whereas the corresponding amounts in tests 1 through 7 varied from 0.1% for the 2.5 hour sulfation of test 6 to 0.16% for the 5 hour sulfation of test 5.

While the present invention has been specifically described with reference to preferred embodiments thereof, it will be readily understood by those skilled in the art that various additions to, or modifications of, the details of the embodiments may be resorted to without departing from the scope of the invention which is defined by the appended claims.

What we claim is:

1. In a process for treating anode slimes which contain copper, selenium and tellurium with sulfuric acid to recover water-soluble compounds of copper and tellurium in solid form, the improvement which comprises introducing the slimes and concentrated sulfuric acid in an amount of between about 120% and 150% by weight of the slime solids into a heated pelletizing apparatus, maintaining the slimes at a temperature between about 180° and 240° C. while forming pellets thereof, and withdrawing formed pellets at such a rate as to provide a residence time of between about 0.5 and 4 hours for the slimes in the pelletizing apparatus, whereby reaction between the sulfuric acid and slimes to solubilize at least part of the copper and tellurium present takes place simultaneously with formation of the pellets.

2. A process in accordance with claim 1 wherein the slimes are pre-mixed with the acid at ambient temperature and continuously introduced into the pelletizing apparatus as a slurry.

3. A process in accordance with claim 2 further including the step of subjecting the pellets withdrawn from the pelletizing apparatus to a curing heat treatment of about 0.5 to 4 hour duration at about 180° to 240° C., whereby further reaction takes place between sulfuric acid and slimes in the pellets to maximize solubilization of the copper and tellurium.

4. A process in accordance with claim 3 wherein the temperature at which the slimes are pelletized and the temperature at which the pellets are cured are between about 190° and 210° C.

5. A process in accordance with claim 4 wherein the cured pellets are subjected to water leaching and unreacted residue from the water leaching is treated for selenium recovery.

* * * * *